United States Patent
Landry et al.

(10) Patent No.: US 8,692,799 B1
(45) Date of Patent: Apr. 8, 2014

(54) SINGLE LAYER MULTI-TOUCH CAPACITIVE SENSOR

(75) Inventors: Greg Landry, San Jose, CA (US); Steve Kolokowsky, San Jose, CA (US); David G. Wright, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 161 days.

(21) Appl. No.: 13/339,822

(22) Filed: Dec. 29, 2011

Related U.S. Application Data

(60) Provisional application No. 61/504,471, filed on Jul. 5, 2011.

(51) Int. Cl.
*G06F 3/045* (2006.01)

(52) U.S. Cl.
USPC .................. 345/174; 345/173; 345/179

(58) Field of Classification Search
USPC ............... 345/173, 174, 179; 324/661; 379/433.07; 710/1; 702/57
See application file for complete search history.

(56) References Cited

U.S. PATENT DOCUMENTS

| | | | |
|---|---|---|---|
| 4,087,625 A | 5/1978 | Dym et al. | |
| 4,264,903 A | 4/1981 | Bigelow | |
| 4,622,437 A | 11/1986 | Bloom et al. | |
| 4,659,874 A | 4/1987 | Landmeier | |
| 4,680,430 A | 7/1987 | Yoshikawa et al. | |
| 4,705,919 A | 11/1987 | Dhawan | |
| 4,952,757 A | 8/1990 | Purcell et al. | |
| 4,999,462 A | 3/1991 | Purcell | |
| 5,305,017 A | 4/1994 | Gerpheide | |
| 5,856,937 A | 1/1999 | Chu et al. | |
| 5,869,790 A | 2/1999 | Shigetaka et al. | |
| 6,147,680 A | 11/2000 | Tareev | |
| 6,188,391 B1 | 2/2001 | Seely et al. | |
| 6,222,522 B1 | 4/2001 | Mathews et al. | |
| 6,239,790 B1 * | 5/2001 | Martinelli et al. | 345/174 |
| 6,297,811 B1 | 10/2001 | Kent et al. | |
| 6,353,200 B1 | 3/2002 | Schwankhart | |
| 6,380,931 B1 | 4/2002 | Gillespie et al. | |
| 6,879,930 B2 | 4/2005 | Sinclair et al. | |
| 6,888,538 B2 | 5/2005 | Ely et al. | |
| 7,129,935 B2 | 10/2006 | Mackey | |
| 7,368,921 B2 * | 5/2008 | Deangelis et al. | 324/661 |
| 7,382,139 B2 | 6/2008 | Mackey | |
| 7,436,395 B2 * | 10/2008 | Chiu et al. | 345/173 |
| 7,548,073 B2 | 6/2009 | Mackey et al. | |

(Continued)

OTHER PUBLICATIONS

U.S. Appl. No. 11/437,507: "Tapered Capacitive Sensing Structure" Tao Peng et al., filed May 18, 2006; 50 pages.

(Continued)

*Primary Examiner* — Thuy Pardo

(57) ABSTRACT

Embodiments described herein provide capacitive sensing devices and methods. A substrate having a plurality of pairs of conductive traces formed thereon is provided. The pairs of conductive traces include first and second conductive traces having first and second opposing ends. A capacitance variation of a plurality of the first conductive traces and a plurality of the second conductive traces is measured. The capacitance variation of at least some of the second conductive traces is measured before the capacitance variation for all of the plurality of first conductive traces is measured. A position coordinate in a two-dimensional coordinate system on the capacitive sensing device is determined based on the measuring a capacitance variation of a plurality of the first conductive traces and a plurality of the second conductive traces.

20 Claims, 5 Drawing Sheets

(56) References Cited

U.S. PATENT DOCUMENTS

| | | | |
|---|---|---|---|
| 7,609,125 B2 * | 10/2009 | van Quach et al. | 333/5 |
| 7,663,607 B2 | 2/2010 | Hotelling et al. | |
| 7,876,309 B2 | 1/2011 | Xiaoping | |
| 8,121,283 B2 * | 2/2012 | Peng et al. | 379/433.07 |
| 8,373,664 B2 * | 2/2013 | Wright | 345/173 |
| 2004/0239650 A1 | 12/2004 | Mackey | |
| 2006/0097991 A1 | 5/2006 | Hotelling et al. | |
| 2006/0278444 A1 | 12/2006 | Binstead | |
| 2007/0247443 A1 | 10/2007 | Philipp | |
| 2007/0257894 A1 | 11/2007 | Philipp | |
| 2007/0271399 A1 * | 11/2007 | Peng et al. | 710/1 |
| 2010/0271330 A1 * | 10/2010 | Philipp | 345/174 |
| 2011/0210935 A1 * | 9/2011 | Chuang | 345/174 |
| 2011/0242001 A1 * | 10/2011 | Zhang et al. | 345/173 |
| 2012/0043141 A1 | 2/2012 | Xiaoping | |
| 2012/0046887 A1 * | 2/2012 | XiaoPing | 702/57 |
| 2012/0313880 A1 * | 12/2012 | Geaghan et al. | 345/173 |

OTHER PUBLICATIONS

U.S. Appl. No. 11/437,518: "Toothed Slider" Jiang XiaoPing et al., filed May 18, 2006; 45 pages.

U.S. Appl. No. 13/012,750: "Toothed Slider," Jiang XiaoPing, filed Jan. 24, 2011; 46 pages.

Chapweske, Adam; "The PS/2 Mouse Interface," PS/2 Mouse Interfacing, 2001, retrieved on May 18, 2006; 11 pages.

Cypress Semiconductor Corporation, "CY8C21x34 Data Sheet," CSR User Module, CSR V.1.0; Oct. 6, 2005; 36 pages.

Hal Philipp, "Charge Transfer Sensing", Spread Spectrum Sensor Technology Blazes New Applications, 1997, 9 pages.

USPTO Advisory Action for U.S. Appl. No. 11/437,507 dated Jul. 12, 2010; 2 pages.

USPTO Final Rejection for U.S. Appl. No. 11/437,507 dated Apr. 15, 2010; 5 pages.

USPTO Final Rejection for U.S. Appl. No. 11/437,507 dated Nov. 14, 2008; 8 pages.

USPTO Final Rejection for U.S. Appl. No. 13/012,750 dated Jan. 23, 2013; 14 pages.

USPTO Non Final Rejection for U.S. Appl. No. 13/304,301 dated Sep. 26, 2013; 7 pages.

USPTO Non-Final Rejection for U.S. Appl. No. 11/437,507 dated Feb. 23, 2009; 9 pages.

USPTO Non-Final Rejection for U.S. Appl. No. 11/437,507 dated Apr. 8, 2008; 5 pages.

USPTO Non-Final Rejection for U.S. Appl. No. 11/437,507 dated Jun. 28, 2011; 5 pages.

USPTO Non-Final Rejection for U.S. Appl. No. 11/437,507 dated Sep. 23, 2010; 6 pages.

USPTO Non-Final Rejection for U.S. Appl. No. 11/437,507 dated Oct. 29, 2009; 5 pages.

USPTO Non-Final Rejection for U.S. Appl. No. 11/437,518 dated Aug. 18, 2009; 10 pages.

USPTO Non-Final Rejection for U.S. Appl. No. 13/012,750 dated Sep. 11, 2012; 13 pages.

USPTO Notice of Allowance for U.S. Appl. No. 11/437,507 dated Mar. 14, 2011; 7 pages.

USPTO Notice of Allowance for U.S. Appl. No. 11/437,507 dated May 2, 2011; 5 pages.

USPTO Notice of Allowance for U.S. Appl. No. 11/437,507 dated Dec. 23, 2011; 7 pages.

USPTO Notice of Allowance for U.S. Appl. No. 11/437,518 dated Feb. 23, 2010; 6 pages.

USPTO Notice of Allowance for U.S. Appl. No. 11/437,518 dated Sep. 17, 2010; 4 pages.

USPTO Notice of Allowance for U.S. Appl. No. 13/012,750 dated Mar. 14, 2013; 5 pages.

USPTO Requirement for Restriction/Election for U.S. Appl. No. 11/437,518 dated Apr. 21, 2009; 6 pages.

\* cited by examiner

SINGLE LAYER MULTI-TOUCH CAPACITIVE SENSOR

RELATED APPLICATION

This application claims the priority benefits of U.S. Provisional Application No. 61/504,471, filed Jul. 5, 2011, which is incorporated in its entirety by reference herein.

TECHNICAL FIELD

This disclosure relates to the field of capacitive sensors, in particular, single layer multi-touch capacitive sensors.

BACKGROUND

Capacitive touch sensors may be used to replace mechanical buttons, knobs and other similar mechanical user interface controls. The use of a capacitive sensor allows for the elimination of complicated mechanical switches and buttons, providing reliable operation under harsh conditions. In addition, capacitive sensors are widely used in modern customer applications, providing new user interface options in existing products. Capacitive touch sensors can be arranged in the form of a sensor array for a touch-sensing surface. When a conductive object, such as a finger, comes in contact or close proximity with the touch-sensing surface, the capacitance of one or more capacitive touch sensors changes. The capacitance changes of the capacitive touch sensors can be measured by an electrical circuit. The electrical circuit converts the measured capacitances of the capacitive touch sensors into digital values.

However, various issues with respect to sensitivity and accuracy lead to some capacitive touch sensors, especially those with single layer sensors, to perform less than ideally.

BRIEF DESCRIPTION OF THE DRAWINGS

The present disclosure is illustrated by way of example, and not by way of limitation, in the figures of the accompanying drawings.

DETAILED DESCRIPTION

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

In the following detailed description, for purposes of explanation, numerous specific details are set forth in order to provide a thorough understanding of the subject matter of the present application. It will be evident, however, to one skilled in the art that the disclosed embodiments, the claimed subject matter, and their equivalents may be practiced without these specific details.

The detailed description includes references to the accompanying drawings, which form a part of the detailed description. The drawings show illustrations in accordance with example embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Figure 1:
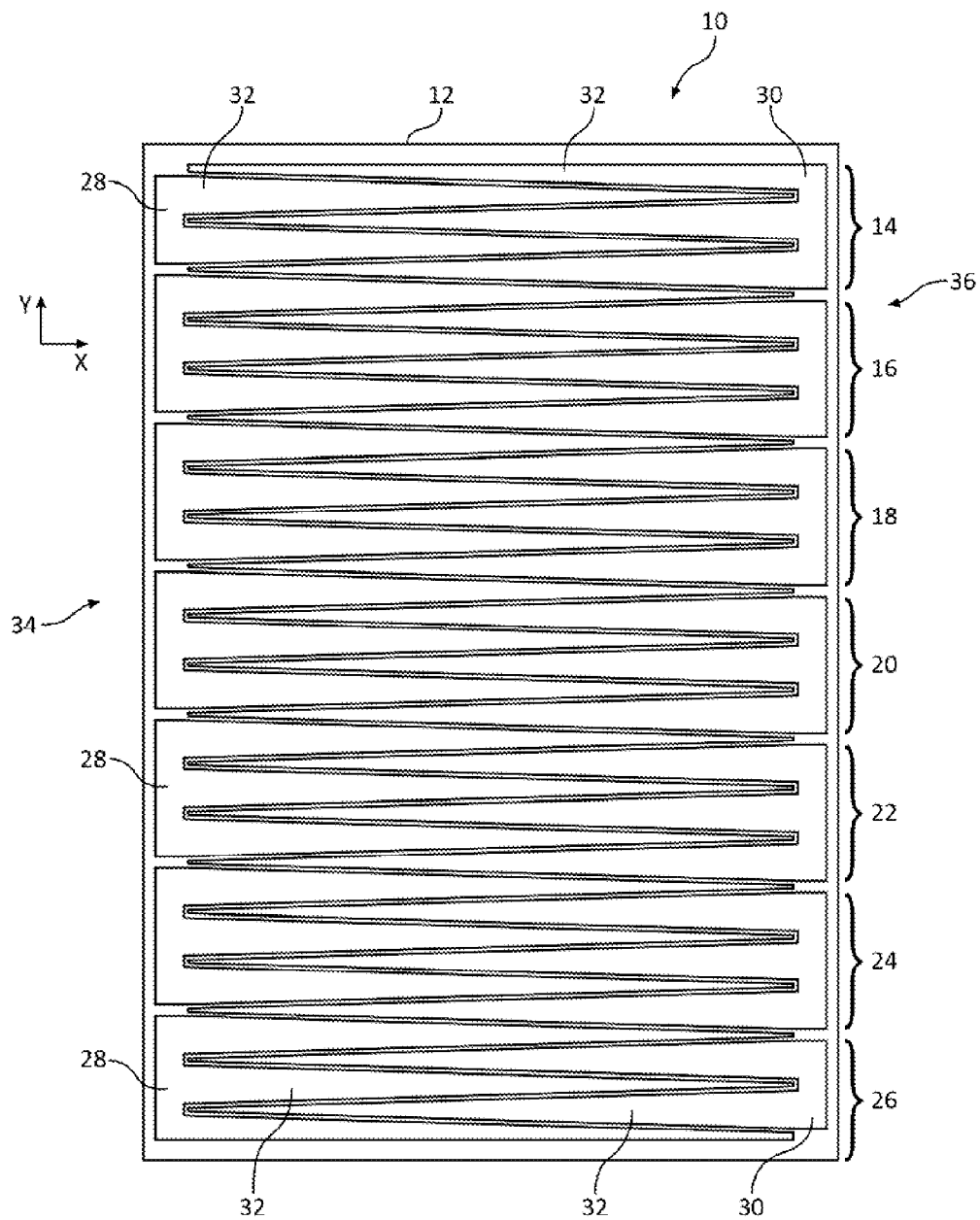
FIG. 1 is a plan view illustrating an embodiment of a touchpad structure.

FIG. 1 illustrates an example of a touchpad structure (or capacitive sensor array) 10 with interleaved conductive traces, or capacitive sensing elements, spaced from each other across a touchpad surface 12 (e.g., a substrate). The touchpad structure 10 includes pairs of conductive traces 14-26, with each of the pairs including a first conductive trace 28 and a second conductive trace 30. The pairs of conductive traces 14-26 are arranged in a series of rows, with each row substantially extending along an x-axis of the structure 10, while the rows are aligned (or stacked) along a y-axis of the structure 10. In one embodiment, the first and second conductive traces are substantially co-planar and made of, for example, indium tin oxide (ITO). Although not shown, each of the conductive traces 28 and 30 may be connected to a corresponding capacitive sensing pin, and may be implemented within an electronic system as described below.

The embodiment shown in FIG. 1 may be referred to as a "backgammon" structure, as each of the conductive traces 28 and 30 includes multiple sub-traces (or fingers or members) 32 that extend towards and interleaved with the sub-traces 32 of the other conductive trace within the same pair of conductive traces. As shown, the sub-traces 32 are tapered in such a way that the width of the sub-traces 32 of the first conductive traces 28 is decreased as the sub-traces 32 extend from a first edge (or side) 34 of the structure 10 to a second edge 36 of the structure 10. In contrast, width of the sub-traces 32 of the second conductive traces 30 is decreased as the sub-traces 32 extend from the second edge 36 of the structure 10 to the first edge 34 of the structure 10.

As a result, the overall width of the first conductive traces 28 decreases from the first edge 34 of the structure 10 (or at a first end of the trace 28) to the second edge of the structure 10 (or at a second end of the trace 28), while the overall width of the second conductive traces 30 decreases from the second edge 36 of the structure 10 (or at a first end of the trace 30) to the first edge of the structure 10 (or at a second end of the trace 30).

By positioning an object, such as a finger or a stylus, near or in contact with a particular portion of the touchpad structure 10, the capacitance between the conductive traces 28 and 30 and ground varies and can be detected. The two-dimensional position of a stylus or a finger on the touchpad structure 10 may be detected by comparing the capacitance variation of each conductive trace 28 and 30 within each pair 14-26, as well as comparing the capacitance variation of the traces 28 and 30 within each pair 14-26 to the conductive traces in neighboring pairs.

More particularly, when the object contacts the touchpad structure 10, a position coordinate along the x-axis may be determined by comparing the capacitance variation between the first conductive trace 28 and the second conductive trace 30 within each of the pairs 14-26 of conductive traces. As the object is positioned closer to the first edge 34 of the structure 10, the capacitance variation of the first conductive trace(s) 28 is increasingly greater than that of the second conductive trace(s) 30, and vice versa. A position coordinate along the y-axis may be determined by comparing the capacitance variation of the traces 28 or 30 in a first pair of traces to the neighboring trace(s) 28 and 30 in an adjacent pair of traces. For example, the determination of the y-axis coordinate may include comparing the capacitance variation of the second trace 30 in conductive trace pair 16 with that of the first trace 28 in conductive trace pair 18.

In prior art implementations, the capacitance variation for the various conductive traces 28 and 30 was performed by sequentially scanning all of the first conductive traces 28 (e.g., starting with the first conductive trace 28 in pair 14 and ending with the first conductive trace 28 in pair 26), and then sequentially scanning all of the second conductive traces 30.

Using such a method, it is possible for the object to be placed on the touchpad structure 10 (i.e., a "touchdown" event) after the first conductive trace 28 has been scanned for a given pair of traces, but before the second conductive trace 30 for that same pair has been scanned. In such a case, the first conductive trace 28 will indicate no signal (or capacitance variation), while the second conductive trace 30 will indicate a signal due to the object. As a result, an x-axis position at the second edge 36 of the structure 10 may be reported, regardless of the actual object location. A similar error may also result when the object is removed from the structure 10 (i.e., a "liftoff" event) after the first conductive trace 28 has been scanned, but before the second conductive trace is scanned. In such an event, an x-axis position at the first edge 34 of the structure 10 may be reported, regardless of actual object location.

In accordance with one aspect of the present invention, the scanning of the conductive traces 28 and 30 is performed in an alternating manner. That is, within each scan cycle, at least some of the second conductive traces 30 are scanned before the scanning of all of the first conductive traces 28 has been completed, and vice versa.

For example, in one embodiment, both conductive traces 28 and 30 in a pair of conductive traces are scanned before the conductive traces 28 and 30 in the next pair is scanned. In such an embodiment, the first conductive trace 28 in conductive trace pair 14 is first scanned, and then the second conductive trace 30 in conductive trace pair 14 is scanned. This process is then sequentially repeated for the remaining conductive trace pairs 16-26.

As a result, the likelihood that the object contacts the structure 10 after one of the traces within a pair of traces has been scanned, but before the other trace within the same pair has been scanned, is greatly reduced. Thus, accuracy of the system is improved.

In accordance with another aspect of the present invention, in order to mitigate the issues associated with the x-axis coordinate during a touchdown event, a touch "de-bounce" is added. That is, after the first scanning cycle in which an object is detected, no coordinate is reported. Instead, another scanning cycle is conducted immediately. The data from this second scan is then used to determine the initial touchdown coordinate. By using such a method, data resulting from an object being placed on the structure 10 between the scanning of the first conductive trace 28 and the second conductive trace 30 within a single conductive trace pair is eliminated, such that the accuracy of the reported coordinate is improved.

In accordance with a further aspect of the present invention, in order to mitigate the issues associated with the x-axis coordinate during a liftoff event, the peak, combined signal strength from the first and second conductive traces 28 and 30 within each pair of conductive traces 14-26 is monitored. In one embodiment, after the presence of the object has been detected, if during a subsequent scanning cycle, the combined signal strength from both conductive traces 28 and 30 has dropped by a threshold amount (e.g., a predetermined percentage of the peak signal strength), it may be assumed that the object was lifted part way through the scan. After such a determination, the coordinate information for that scan is not reported, and another scan is conducted immediately, similar to the "de-bounce" method described above. As a result, data resulting from the object being removed from the structure 10 between the scanning of the first conductive trace 28 and the second conductive trace 30 within a single conductive trace pair is eliminated, such that the accuracy of the reported coordinate is improved.

When using conventional scanning methods, another error that may occur results from the top and bottom portions of the structure being occupied by one of the sub-traces 32 of either one of the first conductive traces 28 or one of the second conductive traces 30. Referring to the example shown in FIG. 1, the top most portion of the structure 10 is occupied by a sub-trace 32 of the second conductive trace 30 in pair 14, while the bottom most portion of the structure 10 is occupied by a sub-trace 32 of the first conductive trace 28 in pair 26. As a result, when using conventional scanning methods, as the object is moved off the structure 10 through the top most portion, the object position that is reported may be incorrectly shifted towards the second edge 36. Similarly, when the object is moved off the structure 10 through the bottom most portions, the object position that is reported may be incorrectly shifted towards the first edge 34.

In accordance with a further aspect of the present invention, in order to mitigate this effect, the touch threshold applied to signals on the top and bottom sensor rows (i.e., signals from the conductive traces having the top-most and bottom-most sub-traces 32 in the structure 10 or those at the respective top and bottom edges) may be increased when compared to that of the other rows (i.e., signals from the conductive traces at the interior or central portion of the structure 10). This reduces the chance that an object covering just one sub-trace 32 of the top most or bottom most conductive trace will lead to a touch being reported.

In addition to the accuracy issues described above, sensitivity to a touch is not uniform across conventional touchpad structures, such as that shown in FIG. 1. Prior art implementations suffer some touch sensitivity variation depending on whether the object is centered over a row (or a column) or between rows.

For example, when an object is in contact near the first edge 34 of the structure 10, the object causes a relatively strong signal on the first conductive traces 28 that it covers but not on the second conductive traces 30, and vice versa. However, an object near the central portion of the structure 10 will cause a signal on both the first and second conductive traces 28 and 30. The magnitude of this signal is less than the peak sensor signal observed when the object is placed near the first or second edges 34 and 36 since the total signal caused by the finger is split among the left and right sensors. Therefore, if the sensor with the largest signal is used to determine the presence of a touch, the panel will be less sensitive near the vertical center line than near the left or right edges. In this case, a compromise may be used to allow enough sensitivity near the vertical center of the panel without being too sensitive near the left and right edges.

In accordance with another aspect of the present invention, in order to improve the uniformity of the sensitivity across the structure 10, rather than using a single peak signal value from one of the conductive traces 28 and 30 to determine whether or not an object is present, the peak sensor signal value added to the sensor signal value from the other conductive trace within the same pair of conductive traces may be used. For example, if the conductive trace with the peak value is the first conductive trace 28 in conductive trace pair 20, that signal value may be added to the signal value of the second conductive trace 30 in conductive trace pair 20. The result is a total signal strength that is nearly constant across any given row which results in a more uniform touch sensitivity. It should be understood that such a method may be used with traditional single electrode or multi-electrode sensor structures, including those utilizing mutual capacitance sensing.

Likewise, if the object is positioned near the first edge 34 but between conductive trace pairs 16 and 18, the signal is divided between the first conductive trace 28 in pair 16 and the first conductive trace 28 in pair 18. Thus, in order to detect the presence of the object using a single, peak signal, the signal threshold must be lowered in order to overcome a lower signal-to-noise ratio (SNR), which may increase the likelihood of a false object detection. This is particularly true in application where the object is considerably smaller than the sensor elements, such as when a stylus is used.

In accordance with another aspect of the present invention, in order to improve the uniformity of the sensitivity across the structure 10, rather than using a single peak signal value from one row of conductive traces 28 and 30 to determine whether or not an object is present, the peak sensor signal value added to the sensor signal value from the adjacent rows of conductive traces may be used. For example, if the conductive trace with the peak value is the first conductive trace 28 in conductive trace pair 20, that signal value may be added to the signal value of the first conductive trace 28 in conductive trace pairs 18 and 22. The result is a total signal strength that is nearly constant across any given set of rows which results in a more uniform touch sensitivity. It should be understood that such a method may be used with traditional single electrode or multi-electrode sensor structures, including those utilizing mutual capacitance sensing and those using an X/Y based arrangement of sensor structures rather than a left/right row based arrangement as described above.

Figure 2:
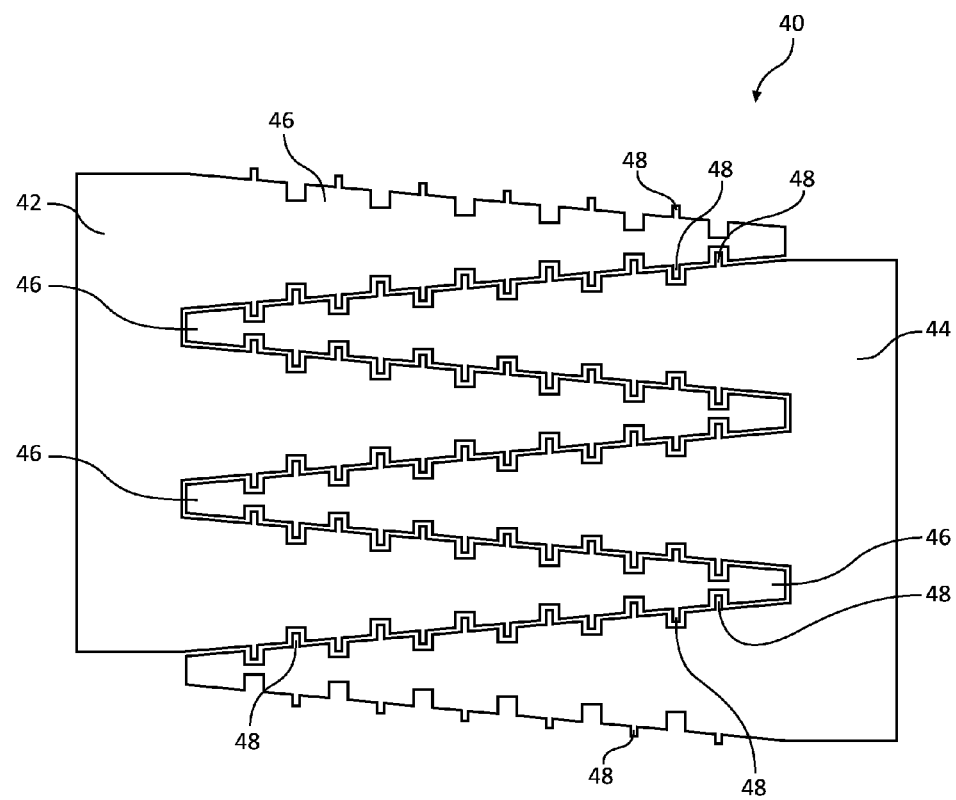
FIGS. 2-4 are plans views illustrating alternative embodiments of touchpad structures.
Figure 3:
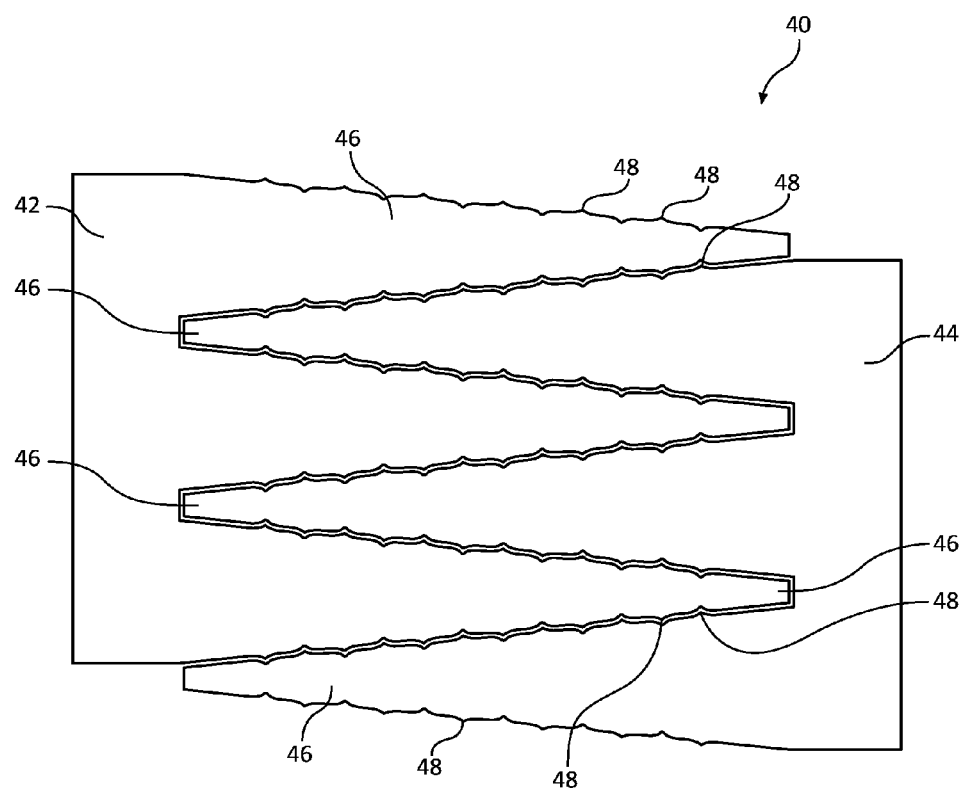
Figure 4:
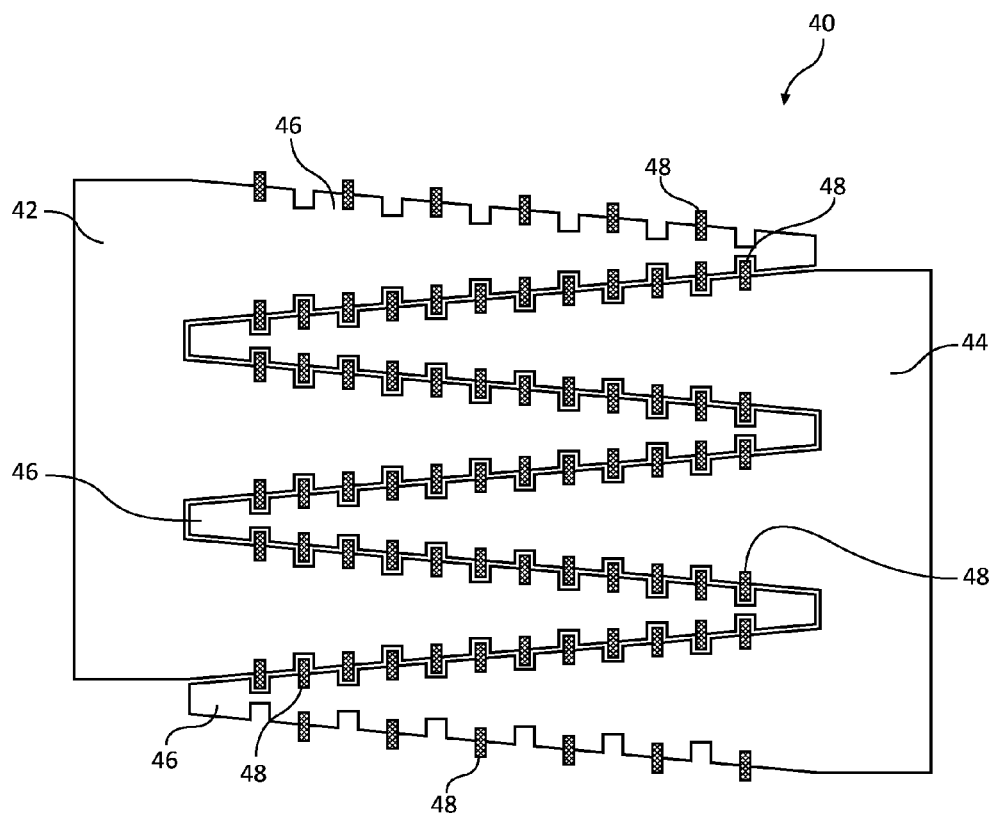

FIGS. 2, 3, and 4, illustrate portions of touchpad structures 40 according to other embodiments of the present invention. As with the embodiment shown in FIG. 1, the embodiment shown in FIGS. 2-4 includes first conductive traces 42 and second conductive traces 44 that are configured in a manner similar to the "backgammon" structure. As such, the first and second conductive traces 42 and 44 includes sub-traces 46. Of particular interest is that the first and second conductive traces 42 and 46 also include series of sub-trace protrusions 48 that extend from the sub-traces 46 thereof into the sub-traces of the other conductive trace. That is, the sub-trace protrusions 48 on the sub-traces 46 of the first conductive trace extend into the sub-traces 46 of the second conductive trace 44, and vice versa. However, the sub-trace protrusions 48 of the first conductive trace 42 are insulated from the second conductive trace 44 by an insulating material (not specifically shown), while being electrically connected to the first conductive trace 42. Likewise, the sub-trace protrusions 48 of the second conductive trace 44 are insulated from the first conductive trace 42, while being electrically connected to the second conductive trace 44.

In the embodiments shown in FIGS. 2 and 3, the sub-trace protrusions 48 are made of the same material, and are integral with, the respective conductive traces. The sub-trace protrusions 48 shown in FIG. 2 are substantially linear, while those in FIG. 3 are in the shapes of a triangle. In the embodiment shown in FIG. 4, the sub-trace protrusions 48 are thin metal traces (e.g., having widths of, for example, 4 micrometers (μm)).

The effect of the sub-trace protrusions 48 is to reduce the size of the "dead zone" in the middle of the thick end of the sub-traces 46. The idea is that even if the touch area is wholly within the thick end of a triangle, the non-linear edge of each triangle will reduce or eliminate the size of the "dead zone" in which the a touch fails to cause a substantial difference in coupling between triangles when a touch occurs within the "dead zone."

Thus, in one embodiment, a method for operating a capacitive sensing device is provided. A substrate having a plurality of pairs of conductive traces formed thereon is provided. Each of the plurality of pairs of conductive traces includes a first conductive trace having at least one sub-trace and a second conductive trace having at least one sub-trace. Within each of the plurality of pairs of conductive traces, at least one sub-trace of the first conductive trace is interleaved with at least one sub-trace of the second conductive trace. Each sub-trace of the first and second conductive traces has a variable width from a first end to a second end thereof. A capacitance variation of a plurality of the first conductive traces and a plurality of the second conductive traces is measured. The capacitance variation of at least some of the second conductive traces is measured before the capacitance variation for all of the plurality of first conductive traces is measured. A position coordinate in a two-dimensional coordinate system on the capacitive sensing device is determined based on the measuring a capacitance variation of a plurality of the first conductive traces and a plurality of the second conductive traces.

In another embodiment, a capacitive sensing device is provided. The capacitive sensing device includes a capacitive sensing array and a processing device. The capacitive sensing array includes a substrate and a plurality of pairs of conductive traces formed on the substrate. Each of the plurality of pairs of conductive traces includes a first conductive trace having at least one sub-trace and a second conductive trace having at least one sub-trace. Within each of the plurality of pairs of conductive traces, at least one sub-trace of the first conductive trace is interleaved with at least one sub-race of the second conductive trace. Each sub-trace of the first and second conductive traces has a variable width from a first end to a second end thereof. The processing device is coupled to the capacitive sensing array. The processing device is configured to measure a capacitance variation of a plurality of the first conductive traces and a plurality of the second conductive traces. The capacitance variation of at least some of the second conductive traces is measured before the capacitance variation for all of the plurality of first conductive traces is measured. The processing device is also configured to determine position coordinate in a two-dimensional coordinate system on the capacitive sensing device based on the measuring a capacitance variation of a plurality of the first conductive traces and a plurality of the second conductive traces.

In a further embodiment, a method for operating a capacitive sensing device is provided. A substrate having a plurality of pairs of conductive traces formed thereon is provided. The plurality of pairs of conductive traces are arranged in a plurality of rows. Each of the plurality of pairs of conductive traces includes a first conductive trace having at least one sub-trace and a second conductive trace having at least one sub-trace. Within each of the plurality of pairs of conductive traces, at least one sub-trace of the first conductive trace is interleaved with at least one sub-trace of the second conductive trace. Each sub-trace of the first and second conductive traces has a variable width from a first end to a second end thereof and are substantially aligned with the plurality of rows. A capacitance variation of a plurality of the first conductive traces and a plurality of the second conductive traces is measured. The capacitance variation of at least some of the second conductive traces is measured before the capacitance variation for all of the plurality of first conductive traces is measured. The presence of an object relative to the substrate is determined based on the measuring a capacitance variation of a plurality of the first conductive traces and a plurality of the second conductive traces.

Figure 5:
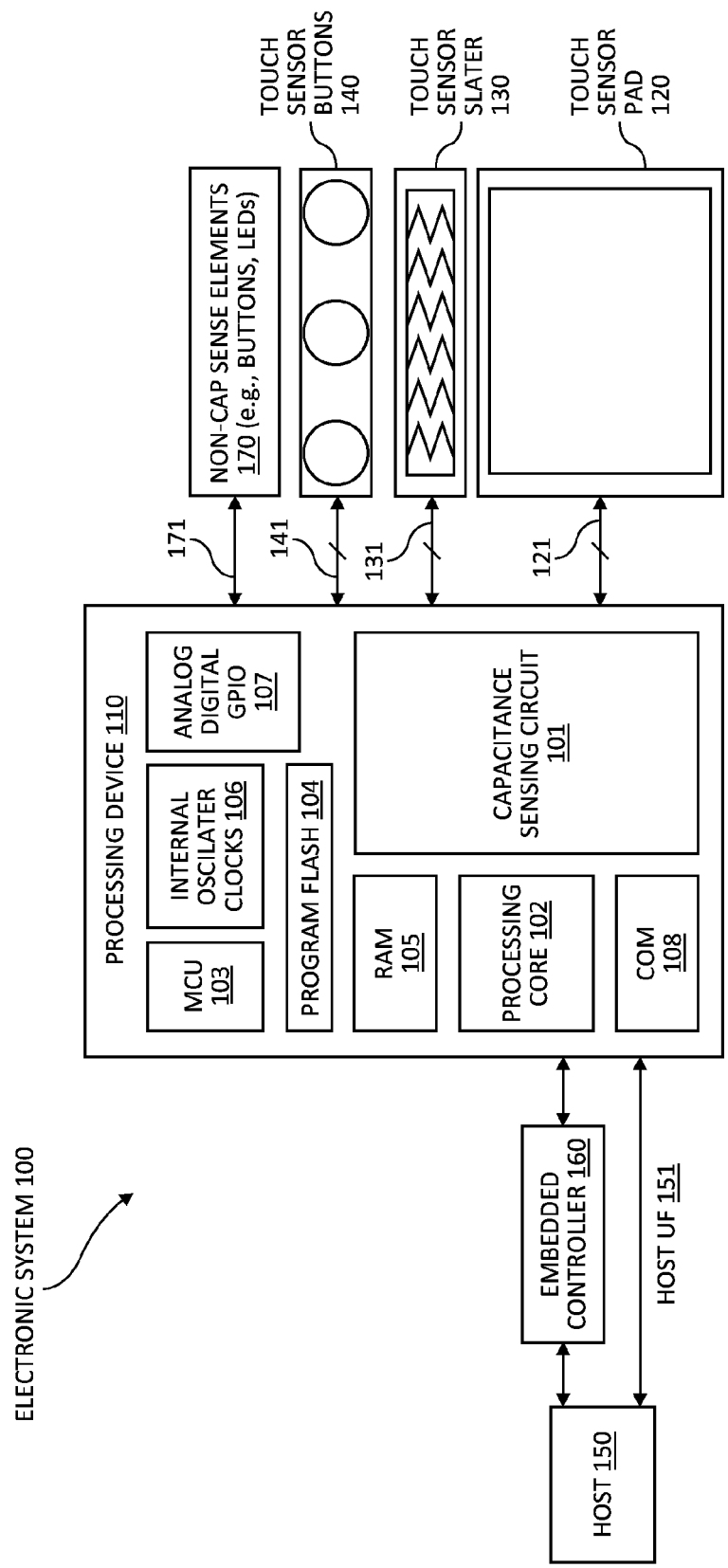
FIG. 5 is a block diagram illustrating an embodiment of an electronic system having a processing device for detecting a presence of a conductive object.

FIG. 5 illustrates a block diagram of one embodiment of an electronic system having a processing device for detecting a presence of a conductive object according to an embodiment of the present invention. The electronic system 100 includes a processing device 110, a touch-sensor pad 120, a touch-sensor slider 130, touch-sensor buttons 140, a host processor 150, an embedded controller 160, and non-capacitance sensor elements 170. The processing device 110 may include analog and/or digital general purpose input/output ("GPIO") ports 107. The GPIO ports 107 may be programmable and may be coupled to a Programmable Interconnect and Logic ("PIL"), which acts as an interconnect between the GPIO ports 107 and a digital block array of the processing device 110. The digital block array may be configured to implement a variety of digital logic circuits (e.g., DACs, digital filters, or digital control systems) using, in one embodiment, configurable user modules ("UMs"). The digital block array may be coupled to a system bus. The processing device 110 may also include memory, such as random access memory ("RAM") 105 and program flash 104. The RAM 105 may be static RAM ("SRAM"), and the program flash 104 may be a non-volatile storage, which may be used to store firmware (e.g., control algorithms executable by processing core 102 to implement operations described herein). The processing device 110 may also include a memory controller unit ("MCU") 103 coupled to memory and the processing core 102.

The processing device 110 may also include an analog block array. The analog block array is also coupled to the system bus. The analog block array also may be configured to implement a variety of analog circuits (e.g., ADCs or analog filters) using, in one embodiment, configurable UMs. The analog block array may also be coupled to the GPIO 107.

As illustrated, the capacitance sensing circuit 101 may be integrated into the processing device 110. The capacitance sensing circuit 101 may include analog I/O for coupling to an external component, such as the touch-sensor pad 120, the touch-sensor slider 130, the touch-sensor buttons 140, and/or other devices. The capacitance sensing circuit 101 and the processing device 110 are described in more detail below.

The embodiments described herein are not limited to touch-sensor pads for notebook implementations, but can be used in other capacitive sensing implementations, for example, the sensing device may be a touch screen, a touch-sensor slider 130, or touch-sensor buttons 140 (e.g., capacitance sensing buttons). In one embodiment, these sensing devices may include one or more capacitive sensors. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc) handwriting recognition and numeric keypad operation.

In one embodiment, the electronic system 100 includes a touch-sensor pad 120 coupled to the processing device 110 via bus 121. The touch-sensor pad 120 may include a multi-dimension sensor array. The multi-dimension sensor array includes multiple sensor elements, organized as rows and columns, such as the sensor arrays described above and shown in FIGS. 1, 2, 3, and 4. In another embodiment, the electronic system 100 includes a touch-sensor slider 130 coupled to the processing device 110 via bus 131. The touch-sensor slider 130 may include a single-dimension sensor array. The single-dimension sensor array includes multiple sensor elements, organized as rows, or alternatively, as columns. In another embodiment, the electronic system 100 includes touch-sensor buttons 140 coupled to the processing device 110 via bus 141. The touch-sensor buttons 140 may include a single-dimension or multi-dimension sensor array. The single- or multi-dimension sensor array may include multiple sensor elements. For a touch-sensor button, the sensor elements may be coupled together to detect a presence of a conductive object over the entire surface of the sensing device. Alternatively, the touch-sensor buttons 140 may have a single sensor element to detect the presence of the conductive object. In one embodiment, the touch-sensor buttons 140 may include a capacitive sensor element. The capacitive sensor elements may be used as non-contact sensor elements. These sensor elements, when protected by an insulating layer, offer resistance to severe environments.

The electronic system 100 may include any combination of one or more of the touch-sensor pad 120, the touch-sensor slider 130, and/or the touch-sensor button 140. In another embodiment, the electronic system 100 may also include non-capacitance sensor elements 170 coupled to the processing device 110 via bus 171. The non-capacitance sensor elements 170 may include buttons, light emitting diodes ("LEDs"), and other user interface devices, such as a mouse, a keyboard, or other functional keys that do not require capacitance sensing. In one embodiment, buses 171, 141, 131, and 121 may be a single bus. Alternatively, these buses may be configured into any combination of one or more separate buses.

The processing device 110 may include internal oscillator/clocks 106 and a communication block ("COM") 108. The oscillator/clocks 106 provides clock signals to one or more of the components of the processing device 110. The communication block 108 may be used to communicate with an external component, such as a host processor 150, via host interface ("I/F") line 151. Alternatively, the processing block 110 may also be coupled to embedded controller 160 to communicate with the external components, such as host 150. In one embodiment, the processing device 110 is configured to communicate with the embedded controller 160 or the host 150 to send and/or receive data.

The processing device 110 may reside on a common carrier substrate such as, for example, an integrated circuit ("IC") die substrate, a multi-chip module substrate, or the like. Alternatively, the components of the processing device 110 may be one or more separate integrated circuits and/or discrete components. In one exemplary embodiment, the processing device 110 may be a Programmable System on a Chip ("PSoC™") processing device, manufactured by Cypress Semiconductor Corporation, San Jose, Calif. Alternatively, the processing device 110 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sensing device and sends the raw data to a host computer where it is analyzed by an application. In effect the processing that is done by processing device 110 may also be done in the host.

The capacitance sensing circuit 101 may be integrated into the IC of the processing device 110, or alternatively, in a separate IC. Alternatively, descriptions of the capacitance sensing circuit 101 may be generated and compiled for incorporation into other integrated circuits. For example, behavioral level code describing the capacitance sensing circuit 101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe the capacitance sensing circuit 101.

It should be noted that the components of the electronic system 100 may include all the components described above. Alternatively, the electronic system 100 may include only some of the components described above.

In one embodiment, the electronic system 100 may be used in a notebook computer. Alternatively, the electronic system 100 may be used in other applications, such as a mobile handset, a personal data assistant ("PDA"), a keyboard, a television, a remote control, a monitor, a handheld multimedia device, a handheld video player, a handheld gaming device, or a control panel.

The conductive object in this case is a finger, alternatively, this technique may be applied to any conductive object, for example, a conductive door switch, position sensor, or conductive pen in a stylus tracking system.

Although the foregoing examples have been described in some detail for purposes of clarity of understanding, the invention is not limited to the details provided. There are many alternative ways of implementing the invention. The disclosed examples are illustrative and not restrictive.

What is claimed is:

1. A method for operating a capacitive sensing device, the method comprising:
   providing a substrate having a plurality of pairs of conductive traces formed thereon, each of the plurality of pairs of conductive traces comprising a first conductive trace having at least one sub-trace and a second conductive trace having at least one sub-trace, wherein within each of the plurality of pairs of conductive traces at least one sub-trace of the first conductive trace is interleaved with at least one sub-trace of the second conductive trace, each sub-trace of the first and second conductive traces having a variable width from a first end to a second end thereof;
   measuring a capacitance variation of a plurality of the first conductive traces and a plurality of the second conductive traces, wherein the capacitance variation of at least some of the second conductive traces is measured before the capacitance variation for all of the plurality of first conductive traces is measured; and
   determining a position coordinate in a two-dimensional coordinate system on the capacitive sensing device based on the measuring a capacitance variation of a plurality of the first conductive traces and a plurality of the second conductive traces.

2. The method of claim 1, wherein the measuring a capacitance variation of a plurality of the first conductive traces and a plurality of the second conductive traces comprises:
   measuring the capacitance variation of the first conductive trace and the second conductive trace within a first of the plurality of pairs of conductive traces; and
   measuring the capacitance variation of the first conductive trace and the second conductive trace within a second of the plurality of pairs of conduct traces after the measuring the capacitance variation of the first conductive trace and the second conductive trace within the first of the plurality of pairs of conductive traces.

3. The method of claim 1, wherein the measuring a capacitance variation of a plurality of the first conductive traces and a plurality of the second conductive traces comprises measuring a capacitance variation of one of the plurality of the first conductive traces and one of the plurality of second conductive traces in an alternating manner.

4. The method of claim 1, further comprising:
   if a change in the measured capacitance variation of the plurality of the first conductive traces and the plurality of the second conductive traces exceeds a predetermined threshold, re-measuring the capacitance variation of the plurality of the first conductive traces and the plurality of the second conductive traces; and
   determining the position coordinate in the two-dimensional coordinate system on the capacitive sensing device based on the re-measured capacitance variation of the plurality of the first conductive traces and the plurality of the second conductive traces.

5. The method of claim 4, wherein the change in the measured capacitance variation is an increase in the measured capacitance variation.

6. The method of claim 4, wherein the change in the measured capacitance variation is a decrease in the measured capacitance variation.

7. The method of claim 1, wherein the plurality of pairs of conductive traces are arranged in a plurality of rows, and wherein at least one sub-trace of the first and second conductive traces are substantially aligned with the plurality of rows.

8. The method of claim 7, wherein the first conductive traces and the second conductive traces each comprises a plurality of protrusions extending from the at least one sub-trace thereof in a direction that is substantially perpendicular to the plurality of rows.

9. The method of claim 8, wherein the plurality of protrusions extending from the sub-traces of the first conductive traces extend into one of the sub-traces of the second conductive traces, and the plurality of protrusions extending from the sub-traces of the second conductive traces extend into one of the sub-traces of the first conductive traces.

10. The method of claim 9, wherein the plurality of protrusions extending from the sub-traces of the first conductive traces are electrically insulated from the sub-traces of the second conductive traces, and the plurality of sub-traces extending from the sub-traces of the second conductive traces are electrically insulated from the sub-traces of the first conductive traces.

11. A capacitive sensing device comprising:
   a capacitive sensing array comprising:
      a substrate; and
      a plurality of pairs of conductive traces formed on the substrate, each of the plurality of pairs of conductive traces comprising a first conductive trace having at least one sub-trace and a second conductive trace having at least one sub-trace, wherein within each of the plurality of pairs of conductive traces at least one sub-trace of the first conductive trace is interleaved with at least one sub-trace of the second conductive trace, each sub-trace of the first and second conductive traces having a variable width from a first end to a second end thereof; and a processing device coupled to the capacitive sensing array, the processing device being configured to:

measure a capacitance variation of a plurality of the first conductive traces and a plurality of the second conductive traces, wherein the capacitance variation of at least some of the second conductive traces is measured before the capacitance variation for all of the plurality of first conductive traces is measured; and determine a position coordinate in a two-dimensional coordinate system on the capacitive sensing device based on the measuring a capacitance variation of a plurality of the first conductive traces and a plurality of the second conductive traces.

12. The capacitive sensing device of claim 11, wherein the plurality of pairs of conductive traces are arranged in a plurality of rows, and wherein at least one sub-trace of the first and second conductive traces are substantially aligned with the plurality of rows.

13. The capacitive sensing device of claim 12, wherein the first conductive traces and the second conductive traces each comprises a plurality of protrusions extending from the sub-traces thereof in a direction that is substantially perpendicular to the plurality of rows.

14. The capacitive sensing device of claim 13, wherein the plurality of protrusions extending from the sub-traces of the first conductive traces extend into one of the sub-traces of the second conductive traces, and the plurality of protrusions extending from the sub-traces of the second conductive traces extend into one of the sub-traces of the first conductive traces.

15. The capacitive sensing device of claim 14, wherein the plurality of protrusions extending from the sub-traces of the first conductive traces are electrically insulated from the sub-traces of the second conductive traces, and the plurality of protrusions extending from the sub-traces of the second conductive traces are electrically insulated from the sub-traces of the first conductive traces.

16. A method for operating a capacitive sensing device, the method comprising:

providing a substrate having a plurality of pairs of conductive traces formed thereon, the plurality of pairs of conductive traces being arranged in a plurality of rows, each of the plurality of pairs of conductive traces comprising a first conductive trace having at least one sub-trace and a second conductive trace having at least one sub-trace, wherein within each of the plurality of pairs of conductive traces at least one sub-trace of the first conductive trace is interleaved with at least one sub-trace of the second conductive trace, each sub-trace of the first and second conductive traces having a variable width from a first end to a second end thereof and being substantially aligned with the plurality of rows;

measuring a capacitance variation of a plurality of the first conductive traces and a plurality of the second conductive traces in an alternating manner; and determining the presence of an object relative to the substrate based on the measuring a capacitance variation of a plurality of the first conductive traces and a plurality of the second conductive traces.

17. The method of claim 16, further comprising:

if a change in the measured capacitance variation of the plurality of the first conductive traces and the plurality of the second conductive traces exceeds a predetermined threshold, re-measuring the capacitance variation of the plurality of the first conductive traces and the plurality of the second conductive traces in an alternating manner; and determining the presence of an object relative to the substrate based on the re-measured capacitance variation of the plurality of the first conductive traces and the plurality of the second conductive traces.

18. The method of claim 16, wherein the presence of the object relative to the substrate is only determined if a combined capacitance variation of at least two of the plurality of first and second conductive traces exceeds a predetermined threshold.

19. The method of claim 16, wherein when the measured capacitance variation corresponds to one of the plurality of first and second conductive traces located at an interior of the plurality of pairs of conductive traces, the presence of the object relative to the substrate is only determined if the measured capacitance variation exceeds a first threshold, and when the measured capacitance variation corresponds to one of the plurality of first and second conductive traces located at an edge of the plurality of pairs of conductive traces, the presence of the object relative to the substrate is only determined if the measured capacitance variation exceeds a second threshold, wherein the second threshold is greater than the first threshold.

20. The method of claim 16, wherein the first conductive traces and the second conductive traces each comprises a plurality of protrusions extending from the at least one sub-trace thereof in a direction that is substantially perpendicular to the plurality of rows.

* * * * *